US009565027B2

(12) United States Patent
Yong et al.

(10) Patent No.: US 9,565,027 B2
(45) Date of Patent: Feb. 7, 2017

(54) MULTI-DESTINATION TRAFFIC CONTROL IN MULTI-LEVEL NETWORKS

(71) Applicant: Futurewei Technologies, Inc., Plano, TX (US)

(72) Inventors: Lucy Yong, Georgetown, TX (US); Donald Eastlake, Milford, MA (US); Weiguo Hao, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 92 days.

(21) Appl. No.: 14/466,849

(22) Filed: Aug. 22, 2014

(65) Prior Publication Data

US 2015/0055652 A1 Feb. 26, 2015

Related U.S. Application Data

(60) Provisional application No. 61/869,536, filed on Aug. 23, 2013.

(51) Int. Cl.
*H04L 12/18* (2006.01)
*H04L 12/931* (2013.01)
*H04L 12/715* (2013.01)

(52) U.S. Cl.
CPC ........... *H04L 12/184* (2013.01); *H04L 12/185* (2013.01); *H04L 45/04* (2013.01); *H04L 49/201* (2013.01)

(58) Field of Classification Search
CPC .... H04L 12/18; H04L 12/185; H04L 12/1836; H04L 12/184; H04L 45/48; H04L 45/02; H04L 45/00; H04L 45/04; H04L 45/16; H04L 45/24; H04L 49/201
See application file for complete search history.

(56) References Cited

U.S. PATENT DOCUMENTS 8,798,055 B1\* 8/2014 An ................. H04L 49/604
370/390
2007/0165657 A1\* 7/2007 Smith .................. H04L 12/18
370/401

(Continued)

OTHER PUBLICATIONS

Satz, G., "Connectionless Network Protocol (ISO 8473) and End System to Intermediate System (ISO 9542) Management Information Base," RFC 1162, Jun. 1990, 70 pages.

(Continued)

*Primary Examiner* — Yemane Mesfin
*Assistant Examiner* — Peter Chen
(74) *Attorney, Agent, or Firm* — Conley Rose, P.C.

(57) ABSTRACT

An internet protocol (IP) traffic control method comprising receiving a message that comprises multicast group information and distribution tree root information from a tree root node in a first network area, determining the border network node is a designated forwarder for the second network area, sending an announcement message that comprises the multicast group information and the distribution tree root information within the second network area, receiving multicast group membership information for a multicast group computing a multicast group membership summary for the first network area and the second network area, sending the multicast group membership summary to first network area and the second network area, computing a distribution tree using the multicast group information and the distribution tree root information, pruning the distribution tree to generate a multicast tree, and communicating multicast data traffic between the first network area and the second network area along the multicast tree.

23 Claims, 8 Drawing Sheets

(56) References Cited

U.S. PATENT DOCUMENTS

| | | | | |
|---|---|---|---|---|
| 2009/0086689 | A1* | 4/2009 | Hunt | H04W 28/06 370/338 |
| 2010/0061269 | A1* | 3/2010 | Banerjee | H04L 12/4675 370/254 |
| 2012/0300774 | A1* | 11/2012 | Casey | H04L 12/462 370/390 |
| 2013/0286817 | A1* | 10/2013 | Allan | H04L 45/48 370/221 |

OTHER PUBLICATIONS

Bradner, S., "Key Words for use in RFCs to Indicate Requirement Levels," RFC 2119, Mar. 1997, 3 pages.
Moy, J., "OSPF Version 2," RFC 2328, Apr. 1998, 244 pages.
Cain, B., et al., "Internet Group Management Protocol, Version 3," RFC 3376, Oct. 2002, 53 pages.
Adams, A., et al., "Protocol Independent Multicast—Dense Mode (PIM-DM): Protocol Specification (Revised)," RFC 3973, Jan. 2005, 61 pages.
Fenner, B., et al., "Protocol Independent Multicast—Sparse Mode (PIM-SM): Protocol Specification (Revised)," RFC 4601, Aug. 2006, 112 pages.
Handley, M., et al., "Bidirectional Protocol Independent Multicast (BIDIR-PIM)," RFC 5015, Oct. 2007, 43 pages.
Przygienda, T., et al., "M-ISIS: Multi Topology (MT) Routing in Intermediate System to Intermediate Systems (IS-ISs)," RFC 5120, Feb. 2008, 14 pages.
Perlman, P., et al., "Routing Bridges (RBridges): Base Protocol Specification," RFC 6325, Jul. 2011, 99 pages.
Eastlake, D., et al., "Transparent Interconnection of Lots of Links (TRILL) use of IS-IS," RFC 6326, Jul. 2011, 25 pages.
Eastlake, D., 3rd, et al., "Transparent Interconnection of Lots of Links (TRILL) Use of IS-IS," RFC 7176, May 2014, 45 pages.
Eastlake, D., 3rd, et al., "Transparent Interconnection of Lots of Links (TRILL): Clarifications, Corrections, and Updates," RFC 7180, May 2014, 24 pages.
Yong, L., et al., "IS-IS Protocol Extension for Building Distribution Trees," draft-yong-isis-ext-4-distribution-tree-02.txt, Jun. 12, 2014, 17 pages.
Ghanwani, A., et al., "Multicast Issues in Networks Using NVO3," draft-ghanwani-nvo3-mcast-issues-01.txt, Feb. 13, 2014, 10 pages.
Eastlake, D., et al., "Transparent Interconnection of Lots of Links (TRILL) Use of IS-IS," draft-ietf-isis-rfc6326bis-01.txt, Apr. 8, 2013, 48 pages.
Lasserre, M., et al., "Framework for DC Network Virtualization," drft-ietf-nvo3-framework-09.txt, Jul. 4, 2014, 25 pages.
Mahalingam, M., et al., "VXLAN: A Framework for Overlaying Virtualized Layer 2 Networks over Layer 3 Networks," draft-mahalingam-dutt-dcops-vxlan-04.txt, May 8, 2013, 22 pages.
McBride, M., et al., "Multicast in the Data Center Overview," draft-mcbride-armd-mcast-overview-02.txt, Jul. 16, 2012, 11 pages.
Perlman, R., et al., "Flexible Multilevel TRILL (Transparent Interconnection of Lots of Links)," draft-perlman-trill-rbridge-multi-level-08.txt, Jun. 30, 2014, 28 pages.
Senevirathne, T., et al., "Default Nickname Based Approach for Multilevel TRILL," draft-tissa-trill-multilevel-02.txt, May 28, 2013, 24 pages.
Yong, L., et al., "ISIS Protocol Extension for Building Distribution Trees," draft-yong-isis-ext-4-distribution-tree-00.txt, Jul. 8, 2013, 13 pages.
Yong, L., et al., "ISIS Protocol Extension for Building Distribution Trees," draft-yong-isis-ext-4-distribution-tree-01.txt, Oct. 18, 2013, 16 pages.
"Information Technology—Telecommunications and Information exchange between systems—Intermediate System to Intermediate System intra-domain routeing information Exchange protocol for use in conjunction with the protocol for providing the connection-less-mode network service (ISO 8473)," International Standard, ISO/IEC 10589, Second Edition, Nov. 15, 2002, 210 pages.

* cited by examiner

MULTI-DESTINATION TRAFFIC CONTROL IN MULTI-LEVEL NETWORKS

CROSS-REFERENCE TO RELATED APPLICATIONS

The present application claims priority to U.S. Provisional Application No. 61/869,536 filed Aug. 23, 2013 by Lucy Yong, et al., and entitled "System and Methods for Internet Protocol Multi-Destination Transport in an Interior Gateway Protocol Multi-Level Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A data center (DC) network virtualization may comprise end-points in a network to decouple from a DC physical infrastructure network, for example, in terms of address space and/or configurations. It may be desirable in a DC network virtualization solution for DC physical networks to carry a plurality of traffic types including multi-destination traffic. Conventional internet protocol (IP) network technologies may support unicast traffic transport, but may not support multi-destination traffic forwarding. A variety of protocol independent multicast (PIM) solutions may be designed to carry IP multicast traffic over IP networks. However, using PIM for multicast transport may have several drawbacks that may unnecessarily consume network resources. Applying PIM to a DC IP network that supports network virtualization overlays may be challenging. For example, a solution may require multicast support in the underlying network to simulate an overlay layer 2 broadcast capability, where every node in an overlay virtual network is a multicast source and receiver. An overlay virtual network topology may be sparse and/or dynamic compared to the underlying IP network topology. PIM solutions may also be unable to scale with a large number of overlay virtual networks in a DC.

SUMMARY

In one embodiment, this disclosure includes a traffic control method comprising receiving a message that comprises multicast group information and distribution tree root information from a tree root node in a first network area, wherein the multicast group information comprise a plurality of multicast group IP addresses and a plurality of group masks, and wherein the distribution tree root information identifies the tree root node, determining the border network node is a designated forwarder for the second network area, sending an announcement message that comprises the multicast group information and the distribution tree root information within the second network area, receiving multicast group membership information for a multicast group computing a multicast group membership summary for the first network area and the second network area, sending the multicast group membership summary for the second network area to first network area and the multicast group membership summary for the first network area to the second network area, computing a distribution tree in accordance with the multicast group information and the distribution tree root information, pruning the distribution tree in accordance with the multicast group membership information, wherein pruning the distribution tree generates a multicast tree, and communicating multicast data traffic between the first network area and the second network area along the distribution tree.

In another embodiment, this disclosure includes an apparatus comprising a receiver configured to receive data traffic from a plurality of network areas, and a processor coupled to a memory and the receiver, wherein the memory comprises computer executable instructions stored in a non-transitory computer readable medium such that when executed by the processor causes the processor to receive a flooded message that comprises multicast group information and distribution tree root information from a tree root node in a first network area of the plurality of network areas, wherein the multicast group information comprises a plurality multicast group IP addresses and a plurality of group masks, wherein the distribution tree root information identifies the tree root node in the first network area, determine the apparatus is a designated forwarder for a second network area of the plurality of network areas, send an announcement message within the second network area, wherein the announcement message comprises the multicast group information and the distribution tree root information, and wherein the announcement message indicates that the apparatus is a tree root node in the second network area, receive multicast group membership information from one or more network nodes in the first network area, the second network area, or both, compute a distributed tree using the multicast group information and the distribution tree root information, send a multicast group membership summary for the second network area to the first network area and a multicast group membership summary for the first network area to the second network area, prune the distribution tree using the multicast group membership information, wherein pruning the distribution tree generates a multicast tree, and communicate multicast data traffic between the first network area and the second network area along the distribution tree.

In yet another embodiment, this disclosure includes a computer program product comprising executable instructions stored on a non-transitory computer readable medium, such that, when executed by a processor, causes a network node to receive a flooded message that comprises multicast group information and distribution tree root information from a tree root node in a first network area, wherein the multicast group information identifies a multicast group, wherein the distribution tree root information identifies the tree root node in the first network area, determine the network node is a designated forwarder for a second network area, send an announcement message within the second network area, wherein the announcement message comprises the multicast group information and the distribution tree root information, and wherein the announcement message indicates that the apparatus is a tree root node in the second network area, receive multicast group membership information from the multicast group, send a multicast group membership summary, compute a distribution tree using the group membership information and the distribution tree root information, send a multicast group membership summary, prune the distribution tree in accordance with the multicast group membership information, wherein pruning the multicast group membership information computes a multicast tree, and communicate multicast data traffic between the first network area and the second network area along the distribution tree.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for establishing a bi-directional IP multicast distribution tree in multi-level intermediate system to intermediate system (ISIS) IP networks, for establishing bi-directional distribution trees in one area for IP multicast, for supporting IP multicast transport in multi-level ISIS IP networks, and for supporting IP multicast transport in general interior gateway protocol (IGP) networks. An ISIS protocol and/or an open shortest path first (OSPF) protocol may also be extended to support IP multicast inter-area transport in multi-level ISIS IP networks and/or OSPF IP networks. For example, an ISIS protocol extension may be configured to include a sub-type-length-value (TLV) for inter-area routers to announce the capability to support inter-area multi-destination transport. An ISIS protocol extension may also be configured to one or more bits or bytes in a root address (RTADDR) sub-TLV and/or in a RTADDR IP version 6 (RTADDRV6) sub-TLV for local area rooted-trees. An IGP control plane protocol may be configured to support both unicast and multicast traffic transport, to reduce control traffic, and to speed up convergence of multicast routing.

Figure 1:
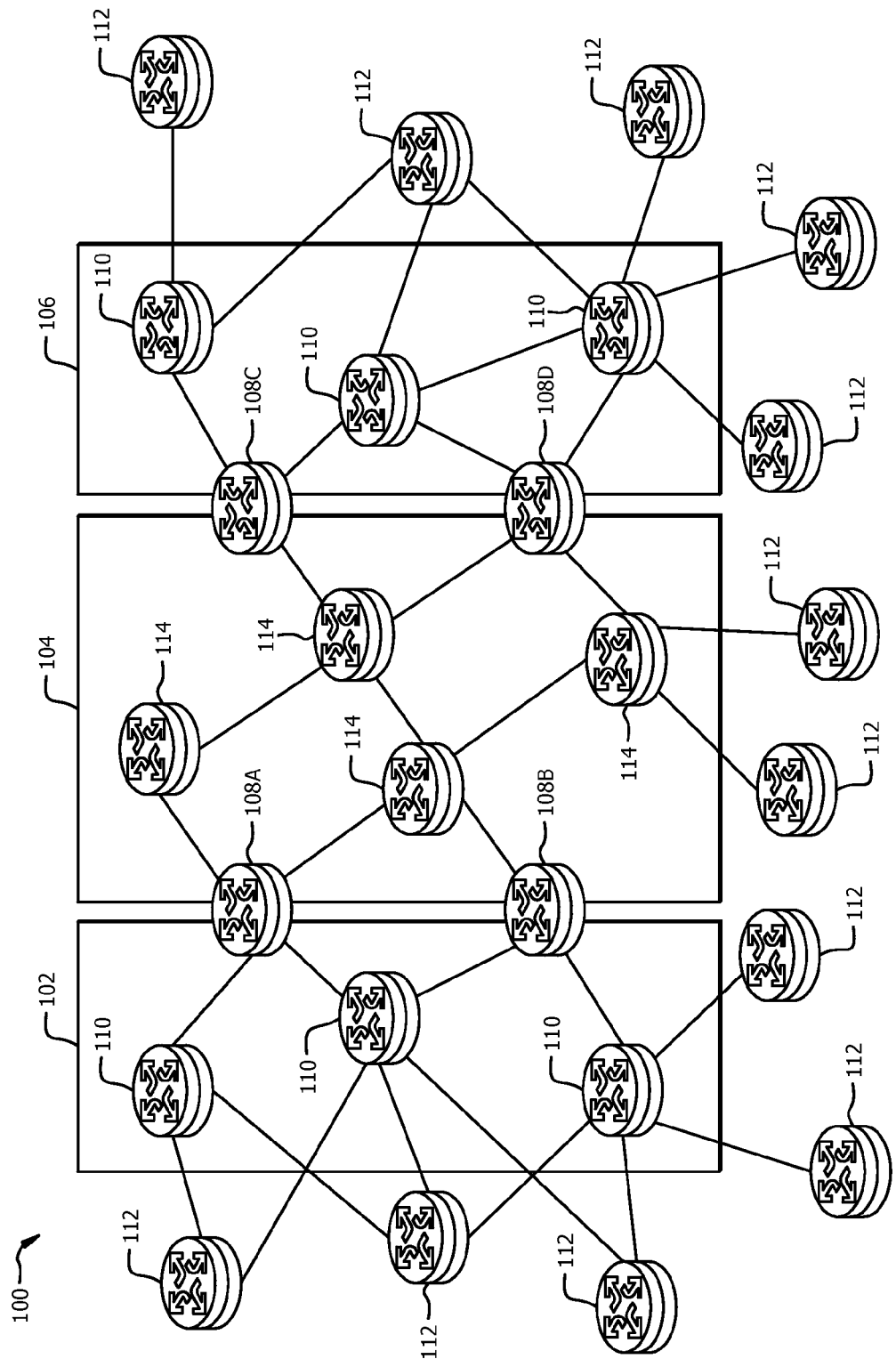
FIG. 1 is a schematic diagram of an embodiment of a multi-area network.

FIG. 1 is a schematic diagram of an embodiment of multi-area network 100. In an embodiment, the multi-area network 100 may be an IGP network and may comprise one or more ISIS network areas and/or one or more OSPF network areas. For example, the multi-area network 100 may be an ISIS based network that comprises three network areas 102-106. Network areas 102-106 may each be configured as an ISIS level 1 (L1) area or an ISIS level 2 (L2) area. For example, network areas 102 and 106 may be configured as ISIS L1 areas and may comprise a plurality of network nodes 110. Network nodes 110 within an L1 network area may be configured to have route visibility and topology visibility within their own areas. Network area 104 may be configured as an ISIS L2 area (e.g., a backbone network area) and may comprise a plurality of network nodes 114. Network nodes 114 within an L2 network area may be configured to have route visibility into L1 network areas and L2 network areas and may have topology visibility into L2 network areas. Network areas 102 and 104 may be coupled to each other via one or more border network nodes (e.g., L1/L2 routers) 108A and 108B. Network areas 104 and 106 may be coupled to each other via one or more border network nodes (e.g., L1/L2 routers) 108C and 108D. Border network nodes 108A-108D may be configured to have topology visibility into both L1 network areas and L2 network areas that are connected to the border network nodes 108A-108D. Border network nodes 108A-108D may comprise and/or maintain a link state database (LSDB) and/or a multicast group database (MGDB) for each L1 network area and L2 network area that is connected to the border network nodes 108A-108D. The LSDBs may be distinct for each of the L1 network areas and the L2 network areas. Border network nodes 108A-108D may be configured to summarize and/or advertise routes between an L1 network area and an L2 network area. Multi-area network 100 may further comprise a plurality of host network nodes 112. The host network nodes 112 may be configured as a multicast source and/or multicast listener (e.g., a receiver). For example, a host network node 112 may comprise a network client and/or server. Each host network node 112 may be coupled to and in data communication with one or more network nodes (e.g., network nodes 110, network nodes 114, and/or border network nodes 108A-108D) and may be associated with one or more multicast trees.

Figure 2:
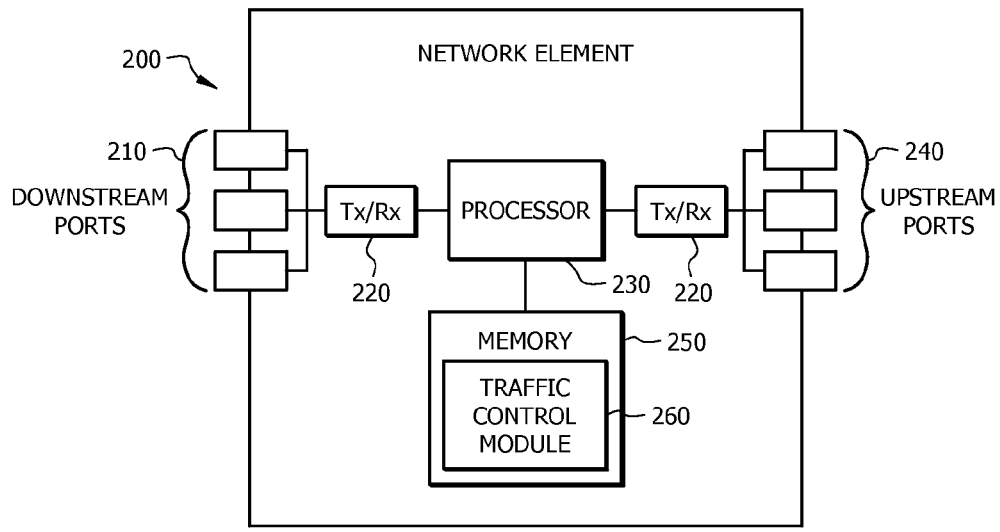
FIG. 2 is a schematic diagram of an embodiment of a network element.

FIG. 2 is a schematic diagram of an embodiment of a network element 200 that may be used to transport and process data traffic through at least a portion of a multi-area network 100 shown in FIG. 1. Network element 200 may be a border network node 108A-108D, a network node 110, a host node 112, and/or a network node 114 as described in FIG. 1. At least some of the features/methods described in the disclosure may be implemented in the network element 200. For instance, the features/methods of the disclosure may be implemented in hardware, firmware, and/or software installed to run on the hardware. The network element 200 may be any device (e.g., a modem, a switch, router, bridge, server, client, etc.) that transports data through a network, system, and/or domain. Moreover, the terms network "element," network "node," network "component," network "module," and/or similar terms may be interchangeably used to generally describe a network device and do not have a particular or special meaning unless otherwise specifically stated and/or claimed within the disclosure. In one embodiment, the network element 200 may be an apparatus configured to establish a bi-directional IP multicast tree in a multi-level ISIS IP network and/or to communicate data traffic through a bi-directional IP multicast tree in a multi-level ISIS IP network. For example, network element 200 may be implemented in and/or integrated within a network node 110, a network node 114, and/or a border network node 108A-108D as described in FIG. 1.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components.

A processor 230 may be coupled to the Tx/Rx 220 and may be configured to process the frames and/or determine which nodes to send (e.g., transmit) the packets. In an example embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to provide unicast and/or multicast data traffic control.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various example embodiments described herein. In one example embodiment, the memory module 250 may comprise a traffic control module 260 that may be implemented on the processor 230. In one embodiment, the traffic control module 260 may be implemented to establish a bi-directional IP multicast distribution tree in a multi-level ISIS IP network and/or to communicate multicast data traffic through a bi-directional IP multicast distribution tree in a multi-level ISIS IP network. For example, the traffic control module 260 may be configured to establish a multicast tree that spans one or more network areas and/or to communicate data traffic (e.g., multicast data traffic) using one or more multicast trees that spans one or more network areas. Traffic control module 260 may be implemented in a transmitter (Tx), a receiver (Rx), or both.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
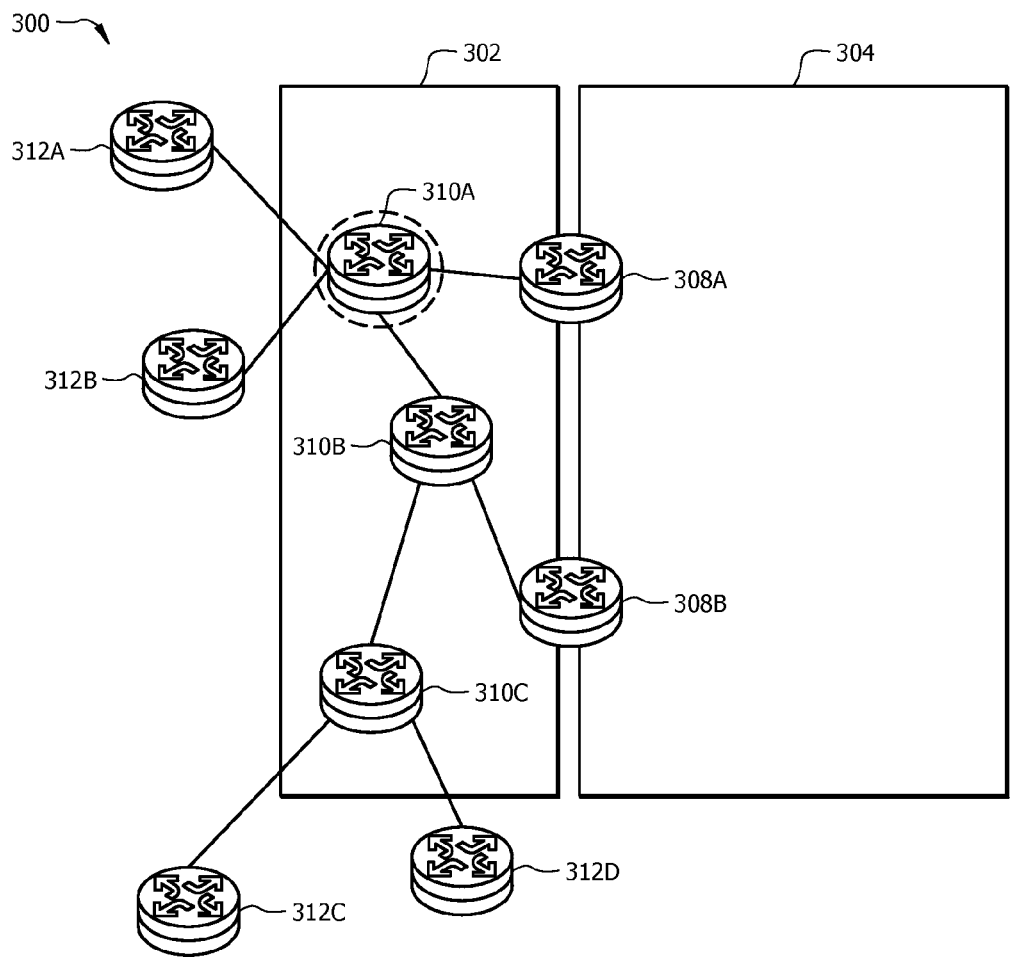
FIG. 3 is a schematic diagram of an embodiment of a multicast distributed tree in a portion of a multi-area network.

FIG. 3 is a schematic diagram of an embodiment of a multicast tree in a portion of a multi-area network 300. Multi-area network 300 may comprise one or more multicast trees within a first network area (e.g., an L1 network area 302), but not extending into a second network area (e.g., an L2 network area 304). The multi-area network 300 may comprise a plurality of network nodes 310A-310C, a plurality of border network nodes 308A and 308B, and a plurality of host network nodes 312A-312D. The network nodes 310A-310C may be configured similar to network nodes 110 and 114, the border network nodes 308A and 308B may be configured similar to border network nodes 108A-108D, and the host network nodes 312A-312D may be configured similar to host network nodes 112 described in FIG. 1. The network nodes 310A-310C, the host network nodes 312A-310D, and/or the border network nodes 308A and 308B may be interconnected in any suitable configuration as would be appreciated by one of ordinary skill in the art upon viewing this disclosure.

A network operator may configure one or more network nodes 310A-310C as a tree root node for a multicast tree within the L1 network area 302. A tree root node may also be referred to as a head node for a distributed tree and/or a multicast tree. A tree root node may be assigned and/or configured by a network operator based on the topology of a multi-area network. For example, network node 310A may be configured as a tree root node for the L1 network area 302. Network node 310A may be configured to flood a message (e.g., a router capabilities TLV and/or a multi-topology (MT) capabilities TLV) that comprises an RTADDR sub-TLV frame (e.g., RTADDR sub-TLV frame 700 described in FIG. 7) to a multicast group to establish a distributed and/or a multicast tree in the L1 network area 302. The flooded message may comprise multicast group information that identifies one or more multicast groups and distribution tree root information that identifies a tree root node. A multicast group may be identified using one or more fields (e.g., a group address field 716 and a group mask field 718 described in FIG. 7) in the RTADDR sub-TLV. The multicast group may comprise network nodes 310B and 310C, border network nodes 308A and 308B, and host network nodes 312A-312D. Each network node within the multicast group may be configured to receive the flooded messages and to compute a distribution tree. For example, each network node may be configured to compute the distribution tree using link state information and/or the shortest path to the tree root node. The distribution tree may be pruned based on the multicast group information and/or the distribution tree root information using any suitable process as would be appreciated by one of ordinary skill in the art upon viewing this disclosure. For example, pruning the distribution tree may comprise removing one or more branches that do not have a downstream receiver. Pruning the distribution tree may generate a multicast tree.

Border network nodes 308A and/or 308B may be configured to not extend the multicast tree that is rooted in the L1 network area 302 into the L2 network area 304. For example, border network nodes 308A and 308B may be configured to receive the flooded message from the tree root node in a first network area and may determine that the distribution tree and/or the multicast tree rooted in the first network area may not be extended into an adjacent network area using one or more fields in the RTADDR sub-TLV frame of the flooded message. Determining that border network nodes 308A and 308B are not designated forwarders or local tree root nodes for the second network area may comprise obtaining a configuration from a network operator and/or implementing an automatic selection algorithm among the border network nodes. When border network nodes 308A and 308B are not configured as a designated forwarder for the second network area, border network nodes 308A and 308B may not send multicast group membership information, distribution tree root information, and/or data traffic associated with the multicast tree that is rooted in the L1 network area 302 to the L2 network area 304. Data traffic may be communicated within the multicast group members of the L1 network area 302 and the multicast tree. The data traffic may comprise unicast and/or multicast data traffic.

Figure 4:
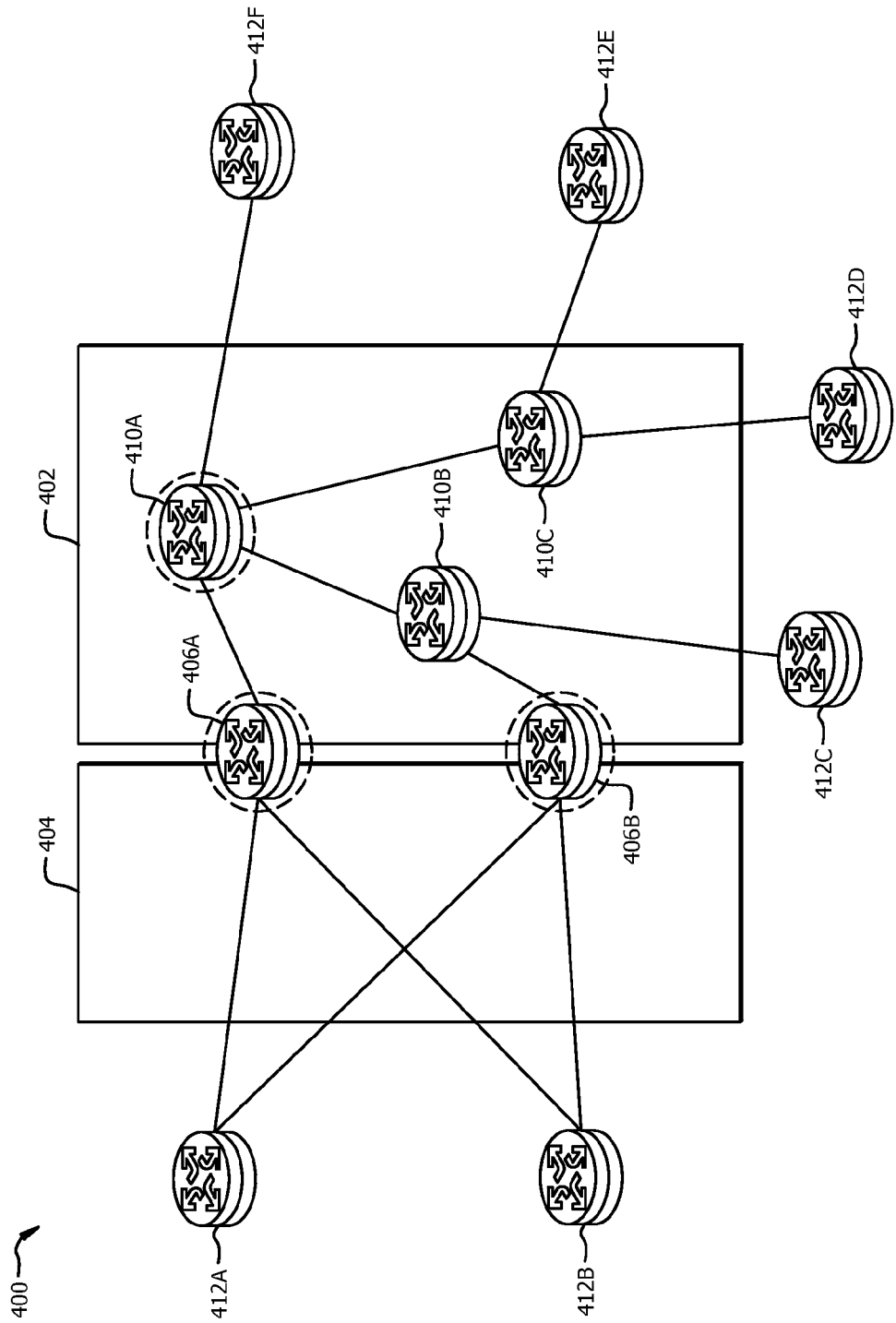
FIGS. 4-6 are schematic diagrams of embodiments of a multicast distributed tree in a multi-area network.

FIG. 4 is a schematic diagram of an embodiment of a multicast tree in a multi-area network 400. The multi-area network 400 may comprise an L1 network area 404, and an L2 network area 402. One or more multicast trees may be configured to span across the L2 network area 402 and the L1 network area 404. The multi-area network 400 may comprise a plurality of network nodes 410A-410C, one or more border network nodes 406A and 406B, and one or more host network nodes 412A-412F. The network nodes 410A-410C may be configured similar to network nodes 110 and 114, the border network nodes 406A and 406B may be configured similar to border network nodes 108A-108D, and the host network nodes 412A-412F may be configured similar to host network nodes 112 described in FIG. 1. The network nodes 410A-410C may be coupled to one or more of the host network nodes (e.g., host network nodes 412C-412F) and/or to one or more of the border network nodes (e.g., border network nodes 406A and 406B). The border network nodes 406A and 406B may be coupled to one or more network nodes (e.g., network nodes 410A-410C) in the L1 network area 404 and/or the L2 network area 402 and/or to one or more host network nodes (e.g., host network nodes 412A and 412B).

A network operator may configure one or more network nodes (e.g., network nodes 410A-410C) as a tree root node for a distribution tree and/or a multicast tree within the L2 network area 402 and/or the L1 network area 404 and/or may identify a plurality of multicast group members within the L2 network are 402. For example, network node 410A may be configured as a tree root node for a multicast tree in the L2 network area 402. Network node 410A may be configured to flood a message (e.g., a router capabilities TLV and/or a MT capabilities TLV) that comprises an RTADDR sub-TLV frame (e.g., RTADDR sub-TLV frame 700 described in FIG. 7) to a multicast group to establish at least a portion of the distribution tree and/or the multicast tree in the L2network area 402. The flooded message may comprise multicast group information that identifies one or more multicast groups and distribution tree root information that identifies a tree root node. A multicast group may be identified using one or more fields (e.g., a group address field 716 and a group mask field 718 described in FIG. 7) in the RTADDR sub-TLV. Each network node in L2network area 402 may be configured to receive the flooded messages and to compute the distribution tree. For example, each network node may be configured to compute the distribution tree using link state information and/or the shortest path to the tree root node. The distribution tree may be pruned based on the multicast group membership information and/or the distribution tree root information using any suitable process as would be appreciated by one of ordinary skill in the art upon viewing this disclosure, and thereby may generate a multicast tree.

Border network nodes 406A and 406B may be configured as a designated forwarder for a multicast tree that extends from the L2 network area 402 into the L1 network area 404. For example, border network nodes 406A and/or 406B may be configured as a designated forwarder by a network operator and/or may determine a designated forwarder configuration using an automatic selection algorithm. As designator forwarders, border network nodes 406A and 406B may each also be referred to as a tree root node (e.g., a local tree root node) for the L1 network area 404 and may be configured to forward data traffic (e.g., multicast traffic) between the L1network area 404 and the L2 network area 402. The border network nodes 406A and 406B may each be configured to support one or more multicast trees that extend across the L2 network area 402 and the L1 network area 404. A plurality of multicast trees may be merged at border network node 406A and/or 406B. When a border network node 406A and/or 406B is configured to merge a plurality of multicast trees, each multicast tree may be processed (e.g., computed and pruned) independently by the border network nodes 406A and 406B. Border network node 406A and/or 406B may be selected as the designated forwarder by a global controller, a network operator, a user, and/or another tree root node. For example, border network node 406A and/or 406B may be selected as a designated forwarder based on a shortest path first (SPF) routing and/or an equal-cost multi-path (ECMP) routing. In an embodiment, a first multicast tree may be rooted at a tree root node (e.g., network node 410A) in the L2 network area 402 and may extend across the L1 network area 404 via border network node 406A which may be configured as a designated forwarder for the first multicast tree in the L1 network area 404. Additionally, the first multicast tree may also extend across the L1 network area 404 via border network node 406B. The border network nodes 406A and 406B may be configured to simultaneously communicate data traffic (e.g., load balancing) or may be configured such that one of the border network nodes is configured as a primary tree root node for the multicast tree and the other border network node is configured as a backup tree root for the first multicast tree. One or more tie breaker rules may be employed to select a primary tree root node when a plurality of border network nodes are configured as designated forwarders. For example, a tie breaker rule may include, but is not limited to, selecting based on a highest priority (e.g., a multicast tree priority) and spreading the multicast group or range among the multicast tree. For instance, spreading the multicast group or range among the multicast tree may comprise using a hashing algorithm with a mod N, where N is the total number of tree roots. In an embodiment, an alarm may be triggered and/or an alert may be sent to a management system or network operator when a plurality of border network nodes are unintentionally configured as designated forwarders. Alternatively, a second multicast tree may be rooted at the tree root node (e.g., network node 410A) in the L2 network area 402 and may extend across the L1 network area 404 via border network node 406B which may be configured as a designated forwarder for the second multicast tree in the L1 network area 404.

In an embodiment, border network node 406A may be configured to receive the flooded message from the tree root and to determine that the border network node 406A is a designated forwarder and/or designated forwarder for the multicast traffic. Determining that border network node 406A is a designated forwarder for the multicast traffic may comprise obtaining a configuration from a network operator and/or implementing an automatic selection algorithm among the border network nodes. Border network node 406A may be configured to send an announcement message to announce itself as a distribution tree root node in the L1 network area 404 for the multicast tree that is rooted in the L2 network area 402. The announcement message may comprise the multicast group information and/or the distribution tree root information. Border network node 406A may be configured to send a multicast group membership information request message (e.g., a link state protocol message (LSP) or a link state advertisement (LSA) request message) to border network node 406B and to host network nodes 412A and 412B. The network nodes and/or host network nodes (e.g., host network nodes 412A and 412B) may be configured to send multicast group membership information response messages (e.g., a group membership LSP response messages) to border network node 406A to announce a group membership for the multicast tree. Border network node 406A may be configured to maintain and/or to track the multicast group membership information for multicast trees in the network areas associated with the border network node 406A. In an embodiment, multicast group memberships may be maintained in different and/or distinct MGDBs. For instance, border network node 406A may be configured to maintain multicast group membership information for the multicast tree that is associated with L1 network area 404 in a first MGDB and multicast group membership information for the multicast tree that is associated with L2 network area 402 in a second MGDB. The network nodes 410A-410C, the host network nodes 412A-412F, and the border network node 406A may be configured to compute a portion of the distribution tree that extends into the L1 network area 404. For example, a portion of the distribution tree may be computed using link state information and/or the shortest path between border network node 406A and host network nodes 412A and 412B. Alternatively, the distribution tree may be computed using any suitable process as would be appreciated by one of ordinary skill in the art upon viewing this disclosure. The portion of the distribution tree may be pruned based on the received multicast group membership information for the multicast tree using any suitable process as would be appreciated by one of ordinary skill in the art upon viewing this disclosure, and thereby may generate a multicast tree. Border network node 406A may be configured to summarize the multicast group membership information and to send a multicast group membership summary from the L1 network area 404 to the L2 network area 402. Data traffic may be communicated between the multicast group members of the L1 network area 404 and the L2 network area 402 using the border network node 406A and the multicast tree that spans across the L1 network area 404 and the L2 network area 402. The data traffic may comprise unicast and/or multicast data traffic. Optionally, the border network node 406A may be configured to perform reverse path forwarding check (RPFC). In an embodiment, an RPFC may comprise determining whether one or more ports are configured to receive a packet for an expected destination address and/or a source address or an address associated with a multicast tree. For example, a packet may be forwarded when the destination address received at a port is expected and may be discarded otherwise.

Figure 5:
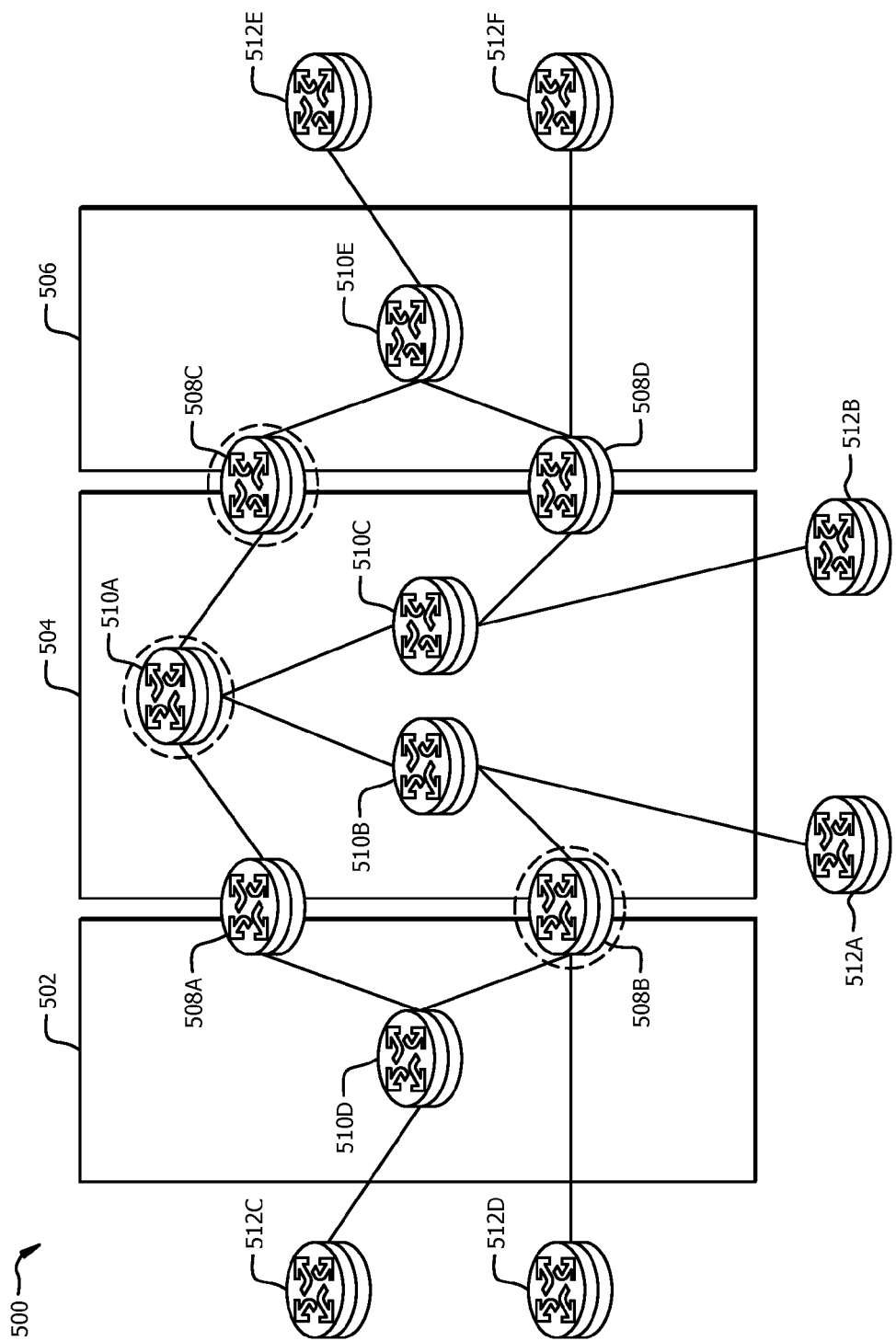

FIG. 5 is a schematic diagram of another embodiment of multicast trees in a multi-area network 500. The multi-area network 500 may comprise one or more multicast trees that span across an L1 network area 502, an L2 network area 504, and/or an L1 network area 506. The multi-area network 500 may comprise a plurality of network nodes 510A-510E, a plurality of border network nodes 508A-508D, and a plurality of host network nodes 512A-512F. The network nodes 510A-510E may be configured similar to network nodes 110 and 114, the border network nodes 508A-508D may be configured similar to border network nodes 108A-108D, and the host network nodes 512A-512F may be configured similar to host network nodes 112 described in FIG. 1. A network operator may configure one or more network nodes 510A-510C as a tree root node for a multicast tree in the L2 network area 504 and/or may identify a multicast group within the L2network area 504. For instance, network node 510A may be configured as a tree root node for a multicast tree that is rooted in the L2 network area 504. Network node 510A may be configured to flood a message (e.g., a router capabilities TLV and/or a MT capabilities TLV) that comprises an RTADDR sub-TLV frame (e.g., RTADDR sub-TLV frame 700 described in FIG. 7) to establish at least a portion of the distribution tree in the L2 network area 504. A multicast group may be identified using one or more fields (e.g., a group address field 716 and a group mask field 718 described in FIG. 7) in the RTADDR sub-TLV. The flooded message may comprise multicast group information that identifies one or more multicast groups and distribution tree root information that identifies a tree root node. Each network node within L2 the multicast group may be configured to receive the flooded messages and to compute the distribution tree. For example, each network node may be configured to compute the distribution tree using link state information and/or the shortest path to the tree root node. The distribution tree may be pruned based on the multicast group information and the distribution tree root information using any suitable process as would be appreciated by one of ordinary skill in the art upon viewing this disclosure, and thereby may generate a multicast tree.

One or more of the border network nodes 508A-508D may be configured as a designated forwarder. For instance, border network node 508B may be configured as a designated forwarder for the L1 network area 502 and border network node 508C may be configured as a designated forwarder for the L1 network area 506. Alternatively, any one or more of the border network nodes 508A-508D may be configured as a designated forwarder for one or more network areas. The multicast tree rooted in the L2 network area 504 may be extended into the adjacent network areas when one or more network nodes in the adjacent network areas are group members of the multicast tree. Border network nodes 508B and 508C may each be configured to receive the flooded message and to determine that the border network nodes 508B and 508C are local tree root nodes and/or designated forwarders for the multicast tree that is rooted in the L2 network area 504. Determining that a border network node 508A-508D is a designated forwarder may comprise obtaining a configuration from a network operator and/or implementing an automatic selection algorithm among the border network nodes. Border network nodes 508B and 508C may each be configured to send an announcement message to announce themselves as distribution tree root nodes in L1 network area 502 and L1 network area 506, respectively, for the multicast tree that is rooted in the L2 network area 504. The announcement message may comprise the multicast group information and/or the distribution tree root information. For instance, border network node 508B may be configured to send a multicast group membership information request message (e.g., an LSP request message) to network node 510D, to border network node 508A, and to host network nodes 512C and 512D. Border network node 508C may be configured to send a multicast group membership information request message (e.g., a group membership LSP request message) to network node 510E, to border network node 508D, and to host network nodes 512E and 512F. The network nodes in the L1 network area 502 and the L1 network area 506 may be configured to send multicast group membership information response messages (e.g., group membership LSP response messages) to border network nodes 508B and 508C to announce a group membership for the multicast tree. Border network nodes 508B and 508C may be configured to maintain and/or to track the multicast group membership information for multicast trees in the network areas associated with the border network nodes 508B and 508C. Multicast group membership information may be maintained in different and/or distinct MGDBs. For instance, border network nodes 508B and 508C may each be configured to maintain multicast group membership information for the multicast tree that is associated with an L1 network area in a first MGDB and multicast group membership information for the multicast tree that is associated with an L2 network area in a second MGDB. One or more portions of the distribution tree that extends into the adjacent areas (e.g., L1 network areas 502 and 506) may be computed by the network nodes 510D and 510E, border network nodes 508B and 508C, and/or host network nodes 512E and 512F. For example, a portion of the distribution tree may be computed using link state information and/or the shortest path between network node 510D, the border network nodes 508A and 508B, and host network nodes 512C and 512D. Another portion of the distribution tree may be computed using the shortest path between network node 510E, the border network nodes 508C and 508D, and host network nodes 512E and 512F. Alternatively, the distribution tree may be computed using any suitable process as would be appreciated by one of ordinary skill in the art upon viewing this disclosure. The one or more portions of the distribution tree may be pruned based on the received multicast group membership information for the multicast tree using any suitable process as would be appreciated by one of ordinary skill in the art upon viewing this disclosure, and thereby may generate a multicast tree. Border network nodes 508B and 508C may be configured to summarize the group membership and to send a multicast group membership summary from one network area (e.g., L1 network areas 502 and 506) to another network area (e.g., L2 network area 504). Data traffic may be communicated between the L1 network area 502, the L1 network area 506, and/or the L2 network area 504 using the border network nodes 508B and 508C and the multicast tree that spans across the L1 network areas 502 and 506 and the L2 network area 504. The data traffic may comprise unicast and/or multicast data traffic. Optionally, one or more of the border network nodes 508A-508D may be configured to perform RPFC.

Figure 6:
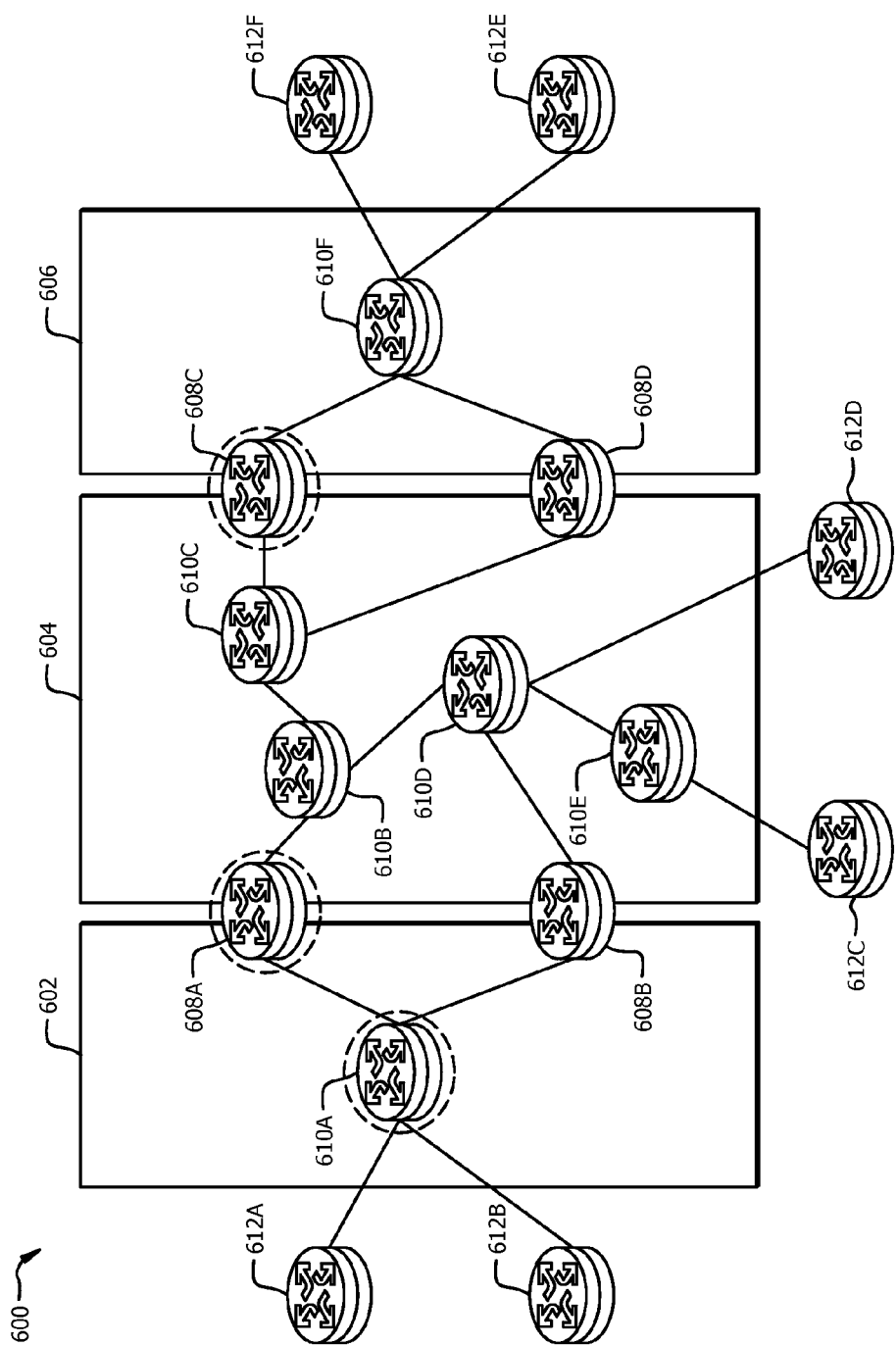

FIG. 6 is a schematic diagram of another embodiment of a multicast tree in a multi-area network 600. The multi-area network 600 may comprise one or more multicast trees that span across an L1 network area 602, an L2 network area 604, and/or an L1 network area 606. The multi-area network 600 may comprise a plurality of network nodes 610A-610F, a plurality of border network nodes 608A-608D, and a plurality of host network nodes 612A-612F. The network nodes 610A-610F may be configured similar to network nodes 110 and 114, the border network nodes 608A-608D may be configured similar to border network nodes 108A-108D, and the host network nodes 612A-612F may be configured similar to host network nodes 112 described in FIG. 1. A network operator may configure network node 610A as a tree root node for a multicast tree in the L1 network area 602 and/or may identify a multicast group within the L1 network area 602. Network node 610A may be configured to flood a message (e.g., a router capabilities TLV and/or a MT capabilities TLV) that comprises an RTADDR sub-TLV frame (e.g., RTADDR sub-TLV frame 700 described in FIG. 7) to establish at least a portion of the distribution tree in the L1 network area 602. The flooded message may comprise multicast group information that identifies one or more multicast groups and distribution tree root information that identifies a tree root node. A multicast group may be identified using one or more fields (e.g., a group address field 716 and a group mask field 718 described in FIG. 7) in the RTADDR sub-TLV. Each network node within the L1 network area 602 may be configured to receive the flooded messages and to compute the distribution tree. For example, each network node may be configured to compute the distribution tree using link state information and/or the shortest path to the tree root node. The distribution tree may be pruned based on the multicast group membership information using any suitable process as would be appreciated by one of ordinary skill in the art upon viewing this disclosure, and thereby may generate a multicast tree.

The multicast tree rooted in the L1 network area 602 may be extended into the adjacent network areas when one or more network nodes (e.g., network nodes 610B-610E) in the adjacent network areas are group members of the multicast tree. Border network node 608A may be configured as a designated forwarder for L2 network area 604. Border network node 608A may be configured to receive the flooded message and to determine that the border network node 608A is a designated forwarder and/or a designated forwarder for the multicast tree that is rooted in the L1 network area 602. Determining that border network node 608A is a designated forwarder may comprise obtaining a configuration from a network operator and/or implementing an automatic selection algorithm among the border network nodes. Border network node 608A may be configured to send an announcement message to announce itself as a distribution tree root node in the L2 network area 604 for the multicast tree that is rooted in the L1 network area 602. The announcement message may comprise the multicast group information and/or the distribution tree root information. For instance, border network node 608A may be configured to send multicast group membership information request message (e.g., an LSP request message) to network nodes 610B-610E, to border network nodes 608B-608D, and to host network nodes 612C and 612D. The network nodes in the L2 network area 604 may be configured to send multicast group membership information response messages (e.g., a group membership LSP response messages) to border network node 608A to announce a group membership for the multicast tree. Border network node 608A may be configured to maintain and/or to track the multicast group membership information for multicast trees in the network areas associated with the border network node 608A. A portion of the distribution tree that extends into the adjacent areas (e.g., L2 network area 604) may be computed using link state information and/or the shortest path between the network nodes 610A-610E, border network nodes 608A-608D, and host network nodes 612C and 612D. Alternatively, the distribution tree may be computed using any suitable process as would be appreciated by one of ordinary skill in the art upon viewing this disclosure. The distribution tree may be pruned based on the received multicast group membership information for the multicast tree using any suitable process as would be appreciated by one of ordinary skill in the art upon viewing this disclosure, and thereby may generate a multicast tree. Border network node 608A may be configured to summarize the group memberships of the L1 network area 602 and the L2 network area 604 and to send a multicast group membership summary between the L1 network area 602 and the L2 network area 604.

Border network node 608C may be configured as a designated forwarder for L1 network area 606. Border network node 608C may be configured to receive the flooded message from border network node 608A and to determine that the border network node 608C is a local tree root node and/or a designated forwarder for the multicast tree that is rooted in the L1 network area 602. Determining that border network node 608C is a designated forwarder may comprise obtaining a configuration from a network operator and/or implementing an automatic selection algorithm among the border network nodes. Border network node 608C may be configured to send an announcement message to announce itself as a distribution tree root in the L1 network area 606 for the multicast tree that is rooted in the L1 network area 602. The announcement message may comprise the multicast group information and the distribution tree root information. For instance, border network node 608C may be configured to send a multicast group membership information request message (e.g., an LSP request message) to network node 610F, to border network node 608D, and to host network nodes 612E and 612F. The network nodes in the L1 network area 606 may be configured to send multicast group membership information response messages (e.g., group membership LSP response messages) to border network node 608C to announce a group membership for the multicast tree. Border network node 608C may be configured to maintain and/or to track the multicast group membership information for multicast trees in the network areas associated with the border network node 608C. A portion of the distribution tree that extends into the L1 network area 606 may be computed using link state information and/or the shortest path between the network node 610F, border network node 608C, and/or host network nodes 612E and 612F. Alternatively, the distribution tree may be computed using any suitable process as would be appreciated by one of ordinary skill in the art upon viewing this disclosure. The distribution tree may be pruned based on the received multicast group membership information for the multicast tree using any suitable process as would be appreciated by one of ordinary skill in the art upon viewing this disclosure, and thereby may generate a multicast tree. Border network node 608C may be configured to summarize the group memberships from the L1 network area 606 and the L2 network area 604 and to send a multicast group membership summary between the L1 network area 606 and the L2 network area 604. Data traffic may be communicated between the L1 network area 602 and the L1 network area 606 via the L2 network area 604 using the border network nodes 608A and 608C and the multicast tree that spans across the L1 network areas 602 and 606 and the L2 network area 604. The data traffic may comprise unicast and/or multicast data traffic. Optionally, one or more of the border network nodes 608A-608D may be configured to perform RPFC.

Figure 7:
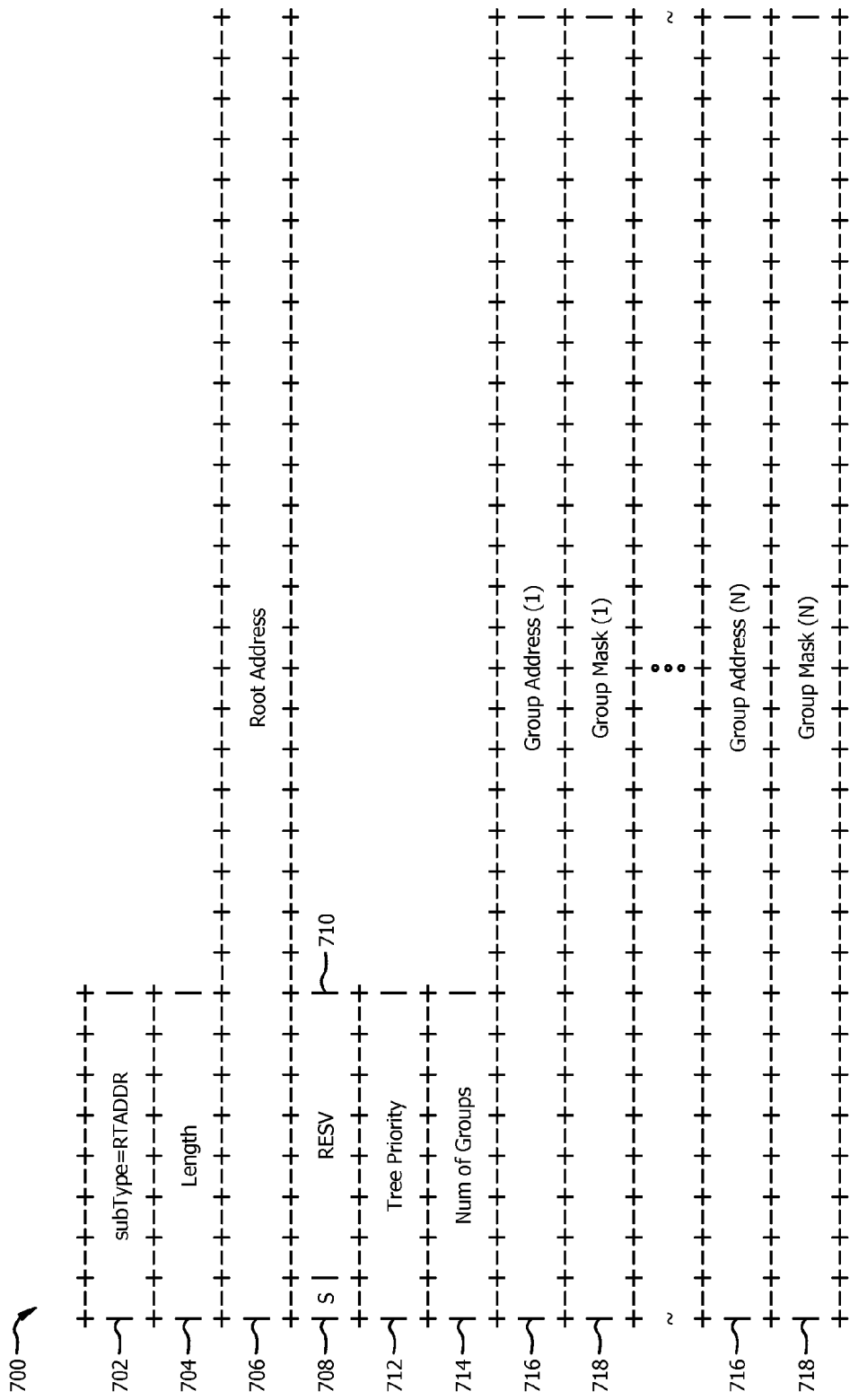
FIG. 7 is a schematic diagram of an embodiment of a root address sub-type-length-value frame.

FIG. 7 is a schematic diagram of an RTADDR sub-TLV frame 700. In an embodiment, the RTADDR sub-TLV frame 700 may be used in a flooding message, such as, a router capabilities TLV and/or a MT capabilities TLV. For example, an RTADDR sub-TLV frame may be incorporated with a flooded message sent by a tree root node as described in FIGS. 3-6. A router capabilities TLV may be as described in Internet Engineering Task Force (IETF) request for comments (RFC) 4970 entitled, "Extensions to OSPF for Advertising Optional Router Capabilities," which is hereby incorporated by reference as if reproduced in its entirety. An MT capabilities TLV may be as described in IETF RFC 5120 entitled, "M-ISIS: Multi Topology (MT) Routing in Intermediate System to Intermediate Systems (ISISs)," which is hereby incorporated by reference as if reproduced in its entirety. A network node (e.g., network node 310A described in FIG. 3) may be configured to use one or more RTADDR sub-TLVs to provide distribution tree root information (e.g., a tree root address) and multicast group information (e.g., multicast group members that are associated with a distribution tree and/or a multicast tree. The RTADDR sub-TLV frame 700 may generally comprise a sub-type field 702, a length field 704, a root address field 706, an s-bit field 708, a reserved (RESV) field 710, a tree priority field 712, a number of groups field 714, one or more group address fields 716, and one or more group mask fields 718. A sub-type field 702 may be about one byte and may indicate that the data frame is an RTADDR sub-TLV. The length field 704 may be about one byte and may indicate the length (e.g., in bytes) of the RTADDR sub-TLV frame 700. The root address field 706 may indicate an address for a tree root node. In an embodiment, the root address field 706 may comprise an IP version 4 (IPv4) address or an IP version 6 (IPv6) address. The s-bit field 708 may comprise a flag bit that indicates whether a rooted multicast tree is for a single network area or crosses multiple network areas. For example, the s-bit field 708 may be set to a first value (e.g., a value of one) to indicate the rooted multicast tree is for a single network area and may be set to a second value (e.g., a value of zero) to indicate the rooted multicast tree crosses multiple network areas. The RESV field 710 may be about three bits and may be set to substantially all zeros. In an embodiment, the RESV field 710 may be ignored upon receipt. The tree priority field 712 may be an eight bit unsigned integer. In an embodiment, a priority may be proportional to the magnitude of the tree priority field 712 value. For example, a larger value magnitude may correspond with a higher priority. Additionally, a zero may indicate no priority. The number of groups field 714 may indicate the number of multicast group member addresses. The group address fields 716 may indicate an address for a multicast group member. In an embodiment, the group address field 716 may comprise an IPv4 address or an IPv6 address and may be as described in IETF RFC 2460 entitled, "Transparent Interconnection of Lots of Links (TRILL) Use of IS-IS." The group mask field 718 may indicate a multicast group range (e.g., a network mask). The group address fields 716 and the group mask field 718 may be associated with each other and may be associated with a multicast group for a multicast tree. The group address fields 716 and the group mask field 718 may overlap with a group address field 716 and a group mask field 718 in a different RTADDR sub-TLV. One or more fields may be omitted and/or any other suitable fields may be included in the RTADDR sub-TLV frame 700 as would be appreciated by one of ordinary skill in the art upon viewing this disclosure.

Figure 8:
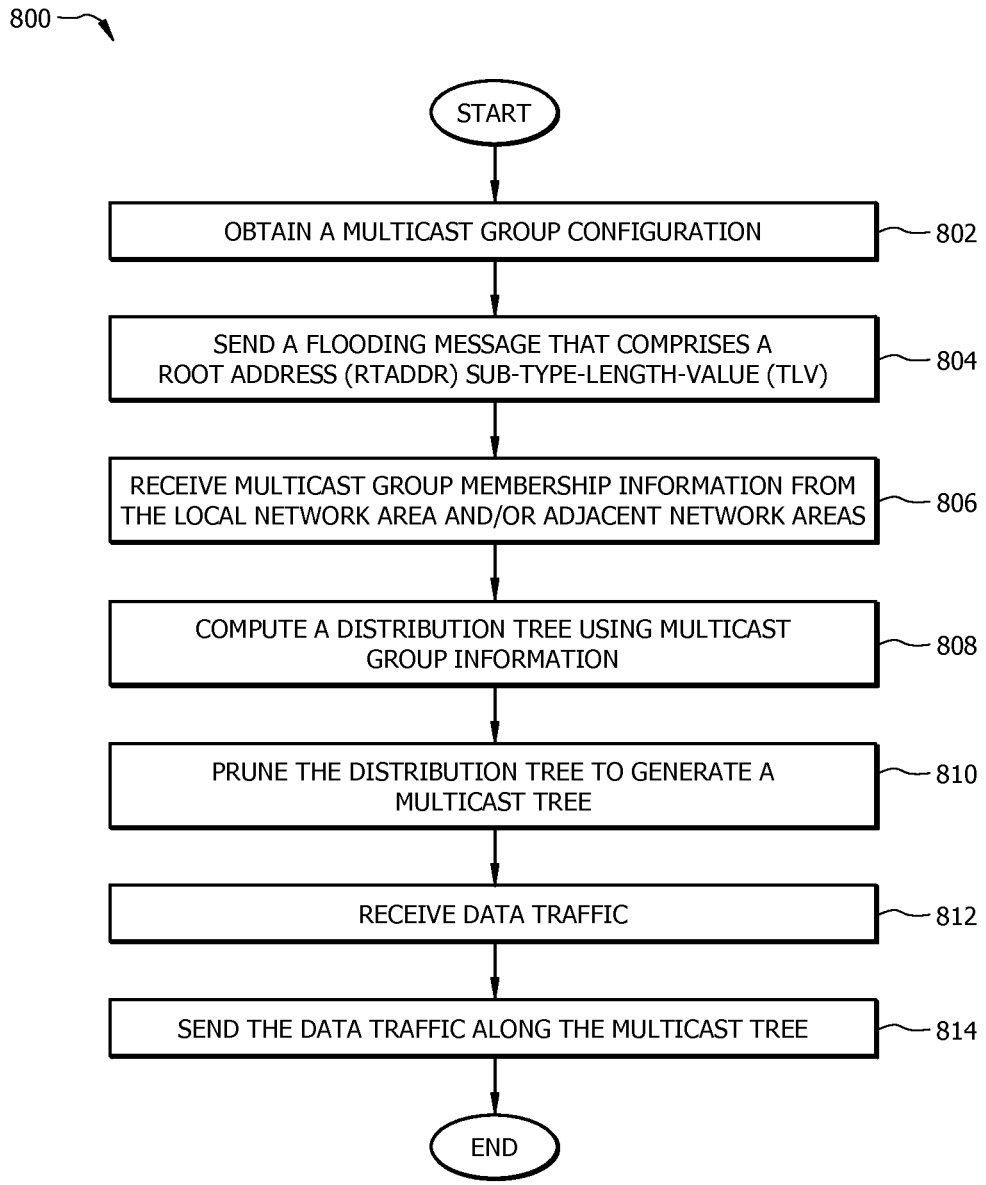
FIG. 8 is a flowchart of an embodiment of a traffic control method.

FIG. 8 is a flowchart of an embodiment of a traffic control method 800 for a tree root node and may be similar to the traffic control module 260 described in FIG. 2. In an embodiment, a tree root node (e.g., network node 510A described in FIG. 5) may be configured to establish a distribution tree and a multicast tree across one or more network areas (e.g., ISIS L1 areas and/or ISIS L2 areas) and to communicate multicast data traffic using the multicast tree. At step 802, method 800 may obtain a multicast group or a multicast tree configuration. Method 800 may receive instructions and/or configurations from a network operator to be configured as a tree root node. Method 800 may be configured with a tree root address for the tree root node and multicast group information for one or more network nodes associated with a multicast tree. The multicast group information may include, but is not limited to, an IP address, a media access control (MAC) address, a link state, a group member mask, and a group member identifier. At step 804, method 800 may send a flooding message that comprises the multicast group information, distribution tree root information (e.g., the tree root address), and/or an RTADDR sub-TLV. Method 800 may generate and/or send a flooding message (e.g., a router capabilities TLV or an MT capabilities TLV) that comprises the multicast group information, distribution tree root information (e.g., a tree root address), and/or a RTADDR sub-TLV in a local network area. The RTADDR sub-TLV may comprise the multicast group information, a tree root address, and may indicate if one or more border network nodes are configured as designated forwarders for adjacent network areas. At step 806, method 800 may receive multicast group membership information from the local network area and/or multicast group membership summaries for adjacent network areas. Method 800 may receive multicast group membership information from one or more network nodes (e.g., network nodes 510B and 510C described in FIG. 5) within the local network area. Method 800 may also receive a group membership summary from one or more border network nodes (e.g., border network nodes 508B and 508C described in FIG. 5) when the border network nodes are configured as local tree root nodes. At step 808, method 800 may compute a distribution tree using the multicast group membership information. Method 800 may compute a distribution tree using the group membership information and/or link state information. For example, the distribution tree may be computed using link state information and the short path between the tree root node and the other network nodes in the multicast group. At step 810, method 800 may prune the distribution tree. Method 800 may prune the distribution tree based on the multicast group membership information and/or the multicast group membership summaries using any suitable protocol as would be appreciated by one of ordinary skill in the art upon viewing this disclosure, and thereby may generate a multicast tree. At step 812, method 800 may receive multicast data traffic from a host network node (e.g., host network nodes 512A-512F described in FIG. 5). At step 814, method 800 may send the data traffic to one or more other host network nodes along the multicast tree.

Figure 9:
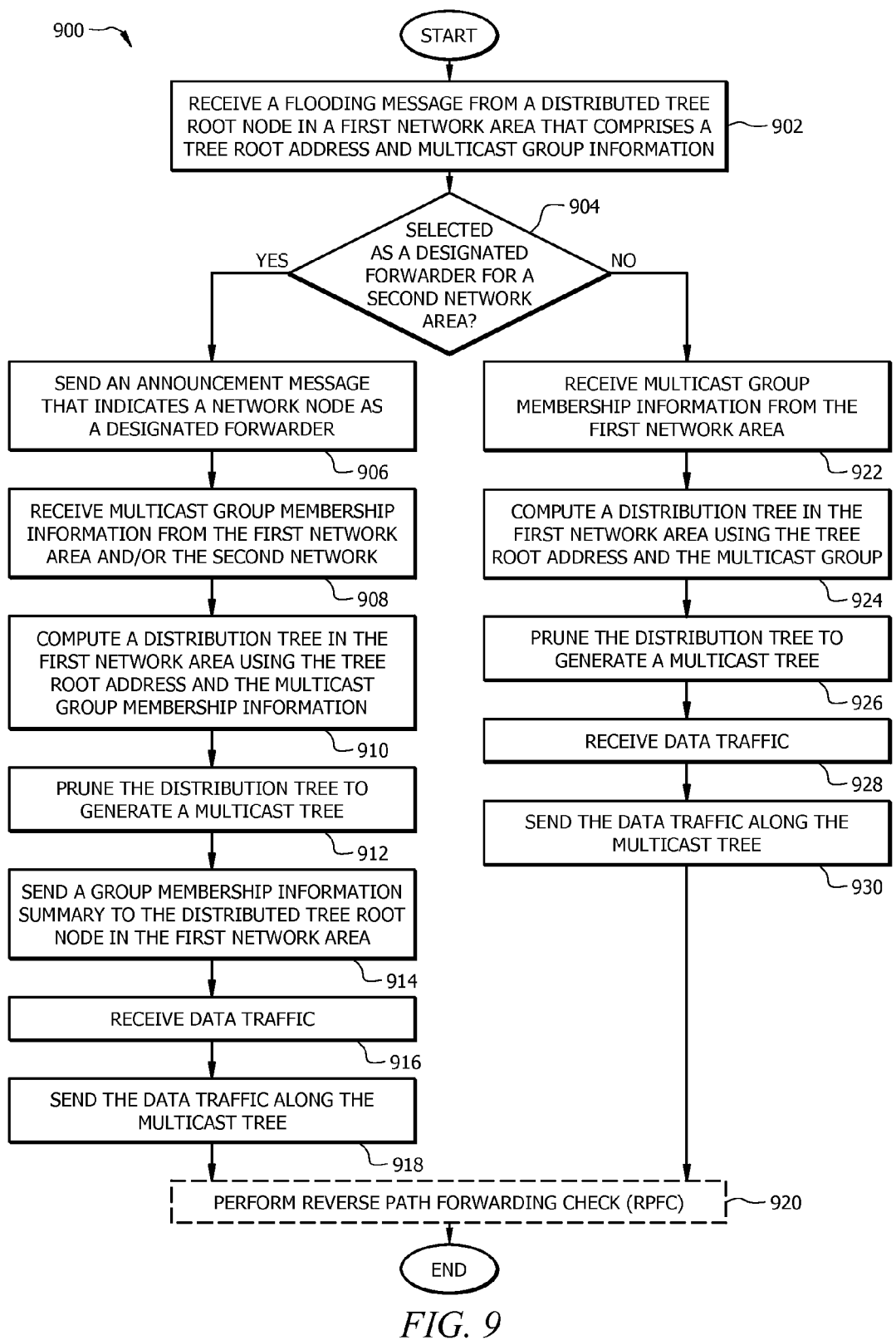
FIG. 9 is a flowchart of another embodiment of a traffic control method.

FIG. 9 is a flowchart of another embodiment of a traffic control method 900 for a border network node and may be similar to the traffic control module 260 described in FIG. 2. In an embodiment, a border network node (e.g., border network node 508C described in FIG. 5) may be configured to establish a distribution tree and a multicast tree across one or more network areas (e.g., ISIS L1 areas and/or ISIS L2 areas) and to communicate multicast data traffic using the multicast tree. At step 902, method 900 may receive a flooding message from a tree root node (e.g., network node 510A described in FIG. 5) in a first network that comprises distribution tree root information (e.g., a tree root address) and multicast group information that identifies one or more network nodes associated with a multicast tree. The flooding message may comprise a router capabilities TLV or an MT capabilities TLV and may comprise an RTADDR sub-TLV that comprises the tree root address for the tree root node and may identify one or more network nodes (e.g., network nodes 510A-510E, border network nodes 508A-508D, and/or host network nodes 512A-512F) associated with a multicast tree rooted at the tree root node. At step 904, method 900 may determine if the border network node is selected as a designated forwarder or a local tree root node for a second network area (e.g., an adjacent network area) using the flooding message. For example, method 900 may determine the border network node is a designated forward using an network operator configuration or an automatic selection algorithm. When the border network node is selected as a designated forwarder for a second network area, method 900 may proceed to step 906; otherwise, method 900 may proceed to step 920. At step 906, method 900 may send an announcement message that indicates the border network node is the distribution tree root for the second network. At step 908, method 900 may receive multicast group membership information from one or more network nodes in the first network area and/or the second network area. The multicast group membership information may indicate a network node's interest in the multicast tree. At step 910, method 900 may compute a distribution tree in the first network area and/or the second network area using the address of the tree root node and the multicast group information received. Method 900 may compute a distribution tree using the multicast group information and the distribution tree root information. For example, the distribution tree may be computed using link state information and the shortest path between the border network node and the other network nodes in the multicast group. At step 912, method 900 may prune the distribution tree to generate a multicast tree. The distribution tree may be pruned based on the multicast group membership information using any suitable protocol as would be appreciated by one of ordinary skill in the art, and thereby may generate a multicast tree. At step 914, method 900 may send a multicast group membership summary for the second network area to the tree root node in the first network area At step 916, method 900 may receive multicast data traffic from a host network node (e.g., host network nodes 512A-512F described in FIG. 5). At step 918, method 900 may send the data traffic to one or more host network nodes along the multicast tree in the first network area and/or the second network area. Optionally, at step 920, method 900 may perform an RPFC and may terminate. Method 900 may determine whether one or more ports are configured to send and/or receive a packet for a particular destination address and/or a source address or an address associated with the multicast tree.

Returning to step 904, when the border network node is not configured as a designated forwarder method 900 may proceed to step 922. At step 922, method 900 may receive multicast group membership information from one or more network nodes in the first network area. At step 924, method 900 may compute a distribution tree in the first network area using the address of the tree root node and the multicast group information. Method 900 may compute a distribution tree using the multicast group membership information. Method 900 may not send multicast group membership information for the multicast tree into an adjacent network area. At step 926, method 900 may prune the distribution tree to generate a multicast tree. The distribution tree may be pruned based on the multicast group membership information using any suitable protocol as would be appreciated by one of ordinary skill in the art, and thereby may generate a multicast tree. At step 928, method 900 may receive multicast data traffic from a host network node (e.g., host network nodes 512A-512F described in FIG. 5). At step 930, method 900 may send the data traffic to one or more host network nodes along the multicast tree in the first network area and may proceed to step 920 as previously described. Method 900 may not send data traffic for the multicast tree into an adjacent network area.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. In a border network node, an Internet Protocol (IP) traffic control method comprising:
  receiving a message that comprises multicast group information and distribution tree root information from a tree root node in a first network area, wherein the multicast group information comprises a plurality of multicast group IP addresses and a plurality of group masks, and wherein the distribution tree root information identifies the tree root node;
determining that the border network node is a designated forwarder for a second network area;
sending an announcement message that comprises the multicast group information and the distribution tree root information within the second network area, wherein the announcement message indicates the border network node is a tree root node in the second network area;
receiving, by the border network node, multicast group membership information from at least one of network nodes in the first network area and at least one of network nodes in the second network area in response to the announcement message;
computing a multicast group membership summary for the first network area and the second network area;
sending the multicast group membership summary for the second network area to the first network area and the multicast group membership summary for the first network area to the second network area;
computing a distribution tree in accordance with the multicast group information and the distribution tree root information;
pruning the distribution tree in accordance with the multicast group membership information, wherein pruning the distribution tree generates a multicast tree; and
communicating multicast data traffic between the first network area and the second network area along the multicast tree.

2. The method of claim 1, wherein determining the border network node is the designated forwarder comprises receiving a configuration from a network operator.

3. The method of claim 1, further comprising performing a reverse path forwarding check (RPFC).

4. The method of claim 1, further comprising tracking the multicast group membership information for the first network area and the second network area.

5. The method of claim 4, wherein the multicast group membership information for the first network area is tracked using a first multicast group database (MGDB) and the second network area is tracked using a second MGDB.

6. The method of claim 1, wherein the first network area and the second network area are intermediate system to intermediate system (ISIS) IP networks.

7. The method of claim 1, wherein the first network area and the second network area are open shortest path first (OSPF) networks.

8. The method of claim 1, wherein the message is one of a router capabilities type-length-value (TLV) or a multi-topology (MT) capabilities TLV.

9. The method of claim 1, wherein the first network area is immediately adjacent to the second network area.

10. The method of claim 1, wherein the second network area is a level 1 (L1) network area.

11. The method of claim 1, wherein the second network area is a level 2 (L2) network area.

12. An apparatus comprising:
a receiver configured to receive data traffic from a plurality of network areas; and
a processor coupled to a memory and the receiver, wherein the memory comprises computer readable executable instructions stored in a non-transitory computer readable medium such that when executed by the processor causes the processor to:
receive a flooded message that comprises multicast group information and distribution tree root information from a tree root node in a first network area of the plurality of network areas, wherein the multicast group information comprise a plurality of multicast group Internet Protocol (IP) addresses and a plurality of group masks, and wherein the distribution tree root information identifies the tree root node in the first network area;
determine that the apparatus is a designated forwarder for a second network area of the plurality of network areas;
send an announcement message within the second network area, wherein the announcement message comprises the multicast group information and the distribution tree root information, and wherein the announcement message indicates that the apparatus is a tree root node in the second network area;
receive multicast group membership information from one or more network nodes in the first network area, and one or more network nodes in the second network area in response to the announcement message;
compute a distribution tree using the multicast group information and the distribution tree root information;
send a multicast group membership summary for the second network area to the first network area and a multicast group membership summary for the first network area to the second network area;
prune the distribution tree using the multicast group membership information, wherein pruning the distribution tree generates a multicast tree; and
communicate multicast data traffic between the first network area and the second network area along the multicast tree.

13. The apparatus of claim 12, wherein the first network area and the second network area are intermediate system to intermediate system (ISIS) IP networks.

14. The apparatus of claim 12, wherein the first network area and the second network area are open shortest path first (OSPF) networks.

15. The apparatus of claim 12, wherein determining the apparatus is the designated forwarder for the second network area comprises using an automatic selection algorithm.

16. A computer program product comprising executable instructions stored on a non-transitory computer readable medium, such that, when executed by a processor, causes a network node to:
receive a flooded message that comprises multicast group information and distribution tree root information from a tree root node in a first network area, wherein the multicast group information identifies a multicast group, wherein the distribution tree root information identifies the tree root node in the first network area;
determine that the network node is a designated forwarder for a second network area;
send an announcement message within the second network area, wherein the announcement message comprises the multicast group information and the distribution tree root information, and wherein the announcement message indicates the network node is a tree root node in the second network area;
receive multicast group membership information from the multicast group in response to the announcement message, wherein the multicast group membership information is received from one or more network nodes in the first network area and one or more network nodes in the second network area;
compute a distribution tree using the multicast group membership information and the distribution tree root information;
send a multicast group membership summary;

prune the distribution tree in accordance with the multicast group membership information, wherein pruning the distribution tree generates a multicast tree; and communicate multicast data traffic between the first network area and the second network area along the multicast tree.

17. The computer program product of claim 16, wherein determining the network node is the designated forwarder for the second network area comprises receiving instructions from a centralized controller.

18. The computer program product of claim 16, wherein the executable instructions, when executed the processor, causes the network node to perform a reverse path forwarding check (RPM).

19. The computer program product of claim 16, wherein the first network area and the second network area are intermediate system to intermediate system (ISIS) internet protocol (IP) networks.

20. The computer program product of claim 16, wherein the first network area and the second network area are open shortest path first (OSPF) networks.

21. The computer program product of claim 16, wherein the executable instructions, when executed by the processor, causes the network node to track the multicast group membership information for the first network area and the second network area.

22. In a border network node, an Internet Protocol (IP) traffic control method comprising:

receiving a message comprising multicast group information and distribution tree root information from a tree root node in a first network area, the multicast group information comprising a plurality of multicast group IP addresses and a plurality of group masks, and the distribution tree root information identifying the tree root node;

determining that the border network node is a designated forwarder for a second network area;

sending an announcement message within the second network area, the multicast group information and the distribution tree root information, wherein the announcement message indicates the border network node is a tree root node in the second network area;

computing a distribution tree for the first network area and the second network area in accordance with the multicast group information and the distribution tree root information;

receiving, from within the first network area, multicast group membership information for a multicast group in the first network area, and from within the second network area, multicast group membership information for the multicast group in the second network area, in response to the announcement message;

sending a multicast group membership summary for the second network area to the first network area and a multicast group membership summary for the first network area to the second network area;

configuring a multicast tree by pruning the distribution tree for the first network area and the second network area in accordance with the multicast group membership information; and communicating multicast data traffic between the first network area and the second network area along the multicast tree.

23. In a border network node, an Internet Protocol (IP) traffic control method comprising:

receiving multicast group information, multicast group membership information and distribution tree root information from a tree root node in a first network area, the multicast group information comprising a plurality of multicast group IP addresses and a plurality of group masks, and the distribution tree root information identifying the tree root node;

determining whether the border network node has a designation as a forwarder for a second network area;

configuring a multicast tree in accordance with the determination; and communicating multicast data traffic along the multicast tree in accordance with the determination, wherein when the border network node lacks the designation as the forwarder, the communicating the multicast data traffic along the multicast tree is limited to the first network area, and the configuring the multicast tree includes computing a distribution tree limited to the first network area in accordance with the multicast group information and the distribution tree root information, and generating the multicast tree by pruning the distribution tree in accordance with the multicast group membership information, and wherein when the border network node has the designation as the forwarder, the communicating the multicast data traffic along the multicast tree includes the multicast data traffic between the first network area and the second network area, and configuring the multicast tree includes sending the multicast group information and the distribution tree root information in an announcement message within the second network area, wherein the announcement message indicates the border network node is a tree root node in the second network area, receiving multicast group member information for a multicast group in the second network area from within the second network area in response to the announcement message, sending a multicast group membership summary for the second network area to the first network area and a multicast group membership summary for the first network area to the second network area, computing a distribution tree for the first network area and the second network area in accordance with the multicast group information and the distribution tree root information, and generating the multicast tree for the first network area and the second network area by pruning the distribution tree in accordance with the multicast group membership information of the first network area and the multicast group membership information of the second network area.

* * * * *